United States Patent Office 3,681,262

Patented Aug. 1, 1972

3,681,262

COMPOSITIONS FOR MAKING ELECTRICAL ELEMENTS CONTAINING PYROCHLORE-RELATED OXIDES

Robert J. Bouchard, Wilmington, Del., assignor to E. I. du Pont de Nemours and Company, Wilmington, Del.

No Drawing. Continuation-in-part of application Ser. No. 880,327, Nov. 26, 1969, which is a continuation-in-part of abandoned application Ser. No. 692,108, Dec. 20, 1967. This application Oct. 1, 1970, Ser. No. 77,309

Int. Cl. H01b 1/06

U.S. Cl. 252—520 16 Claims

ABSTRACT OF THE DISCLOSURE

Compositions, which yield electrical elements such as resistors having a wide range of resistances, low TCR's and good stability properties, comprising (1) an oxide of the formula $$(M_xBi_{2-x})(M'_yM''_{2-y})O_{7-z}$$

wherein

M is at least one metal selected from the group consisting of yttrium, thallium, indium, cadmium, lead and the rare earth metals of atomic number 57–71, inclusive, M' is at least one metal selected from the group consisting of platinum, titanium, tin, chromium, rhodium, rhenium, zirconium, antimony and germanium, M'' is at least one of ruthenium and iridium, and (2) dielectric material.

CROSS-REFERENCE TO RELATED APPLICATIONS

This is a continuation-in-part of U.S. patent application S.N. 880,327, filed Nov. 26, 1969, now U.S. Pat. 3,583,-931, which is a continuation-in-part of U.S. patent application S.N. 692,108, filed Dec. 20, 1967, now abandoned.

BACKGROUND OF THE INVENTION

Compositions useful in preparing electrical elements, including resistive elements, conductive elements and heating elements are in great demand. Each type of electrical element requires a different degree of conductivity and/or resistivity. For example, non-conductive materials (e.g., glasses) are mixed in varying proportions with conductive materials to produce resistor compositions.

Regardless of the type of electrical element being produced, there is a demand for reproducibility, reliability in operation, maintainability and temperature stability as well as other electrical properties. It is an object of this invention to provide electrical elements, particularly resistors, having these desirable properties.

SUMMARY OF THE INVENTION

This invention relates to electrical elements comprising a powdered mixture of (1) an oxide of the formula $$(M_xBi_{2-x})(M'_yM''_{2-y})O_{7-z}$$

wherein

M is at least one metal selected from the group consisting of yttrium, thallium, indium, cadmium, lead and the rare earth metals of atomic number 57–71, inclusive;

M' is at least one metal selected from the group consisting of platinum, titanium, tin, chromium, rhodium, rhenium, zirconium, antimony and germanium;

M'' is at least one of ruthenium and iridium;

$x$ is a number in the range 0–2;

$y$ is a number in the range 0–2, and $z$ is a number in the range 0–1, being at least equal to about $x/2$ when M is a divalent metal, and (2) dielectric material.

Moreover, such compositions may be dispersed in a liquid vehicle, preferably inert, to provide a paint or paste that can be applied to a surface of a substrate and fired to form a stable electrical element.

DESCRIPTION OF THE PREFERRED EMBODIMENTS

The preferred compositions of this invention comprise 5–90% by weight of the pyrochlore-related oxide and 95–10% by weight of dielectric material. Since the preferred utility for the compositions of this invention is in the production of resistor compositions and resistors therefrom, their properties, etc. will be referred to throughout the specification. This is not intended to limit the scope of the invention which also covers other electrical elements.

The essence of this invention lies in the inclusion of pyrochlore-related oxide(s) in the resistor compositions. The ternary bismuth ruthenium oxide and bismuth iridium oxide, which are disclosed and claimed in my copending S.N. 880,327, filed Nov. 26, 1969, now Pat. No. 3,583,931 are incorporated by reference into this specification. The polynary oxides which come within the scope of S.N. 880,327 now Pat. No. 3,583,931 are a preferred group of oxides used in the compositions of this invention. In general, oxides of the formula $$(M_xBi_{2-x})(M'_yM''_{2-y})O_{7-z}$$

where M is at least one metal from the group of yttrium, thallium, indium, cadmium, lead and rare earth metals of atomic number 57–71, inclusive, M' is at least one metal from the group of Pt, Ti, Sn, Cr, Rh, Re, Zr, Sb and Ge, M'' is at least equal to about $x/2$ when M is a divalent metal, are operable for purposes of this invention. It is pointed out that the term "an oxide" designates pyrochlore-related oxides, including multisubstituted oxides (e.g., $NdBiRu_2O_7$, $Pb_{1.5}Cd_{0.5}Ru_2O_6$ $Pb_{1.5}Eu_{0.5}Ru_2O_{6.15}$)

as well as mixtures of said oxides (substituted or unsubstituted). Outstanding among these oxides is $Bi_2Ru_2O_7$; it is electrically conductive with a low resistivity that is substantially independent of temperature over a wide temperature range. $Bi_2Ru_2O_7$ is also stable on heating in air to at least 1000° C., and its properties are not adversely affected by mild reducing conditions. Consequently, when resistor compositions comprising $Bi_2Ru_2O_7$ and glass binder are fired under conventional conditions (e.g., 650–950° C.), the $Bi_2Ru_2O_7$ is essentially unaffected, does not dissociate and remains as an integral part of the fired resistor.

The proportions of the components can vary considerably. Generally, the resistor compositions must comprise from 5–90% of a pyrochlore-related oxide and 95–10% dielectric material. The weight ratios of these components to each other have an effect on the resistance and the temperature coefficient of resistance; but in addition, they also have an effect on the smoothness of the fired resistors, moisture stability, noise level and drift. Furthermore, the type of pyrochlore-related oxide and dielectric material will also affect these properties.

Any inorganic material which serves to bind the oxide(s) to the substrate can be used as the dielectric material. The dielectric material can be any of the inorganic binders and glass frits employed in resistor compositors of this general type. Such frits are generally prepared by melting a glass batch composed of the desired metal oxides, or compounds which will produce the glass during melting, and pouring the melt into water. The coarse frit is then milled to a powder of the desired fineness. Larsen and Short, U.S. Pat. 2,822,279 and Hoffman, U.S. Pat. 3,207,706 describe some frit compositions which can be employed either alone or in combination with glass wetting agents such as bismuth oxide. Typical frit compositions usable as binders in the compositions of this invention include borosilicate glasses such as lead borosilicates, lead aluminosilicates, cadmium borosilicates and similar borosilicates, aluminosilicates and alumino borosilicates. Also mixtures of various inorganic binders may be used.

The resistor compositions of the invention will usually, although not necessarily, be dispersed in an inert vehicle to form a paint or paste for application to various substrates. The proportion of vehicle to resistor composition may vary considerably depending upon the manner in which the paint or paste is to be applied and the kind of vehicle used. Generally, from 1–20 parts by weight of resistor composition (oxide(s) and dielectric material) per part by weight of vehicle will be used to produce a paint or paste of the desired consistency. Preferably, 3–10 parts per part of vehicle will be used.

Any liquid, preferably inert, may be employed as the vehicle. Water or any one of various organic liquids, with or without thickening and/or stabilizing agents, and/or other common additives, may be utilized as the vehicle. Examples of organic liquids that can be used are the higher alcohols; esters of such alcohols, for example the acetates and propionates; the terpenes such as pine oil, alpha- and beta-terpineol and the like; and solutions of resins such as the polymethacrylate esters of lower alcohols, or solutions of ethyl cellulose, in solvents such as pine oil and the monobutyl ether of ethylene glycol monoacetate. The vehicle may contain or be composed of volatile liquids to promote fast setting after application; or it may contain waxes, thermoplastic resins or the like materials which are thermofluid so that the vehicle-containing composition may be applied at an elevated temperature to a relatively cold ceramic body upon which the composition sets immediately.

The resistor compositions are conventionally made by admixing the components in their respective proportions. Additionally, one part of vehicle for every 1–20 parts of solids mentioned above may be admixed. Then the resistor composition is applied to a substrate (e.g., ceramic body) and fined to form a stable resistor.

Application of the resistor composition in paint or paste form to the substrate may be effected in any desired manner. It will generally be desired, however, to effect the application in precise pattern form, which can be readily done by using well-known screen stencil techniques or methods. The resulting print or pattern will then be fired in the usual manner at a temperature from about 650° C.–950° C. in an air atmosphere employing a standard furnace.

The invention is illustrated by the following examples. In the examples and elsewhere in the specification, all parts, ratios and percentages of materials or components are by weight.

EXAMPLE 1

For approximately one hour, 0.9320 g. of $Bi_2O_3$ and 0.5323 g. of $RuO_2$ were ground together in an automatic agate mortar grinder. The ground material was pelleted (conditions not critical) in a hand press. The pellets were placed in a silica tube which was evacuated and sealed. The tube was then fired at about 800° C. in a muffle furnace for approximately 24 hours. At the end of this time, the sealed silica tube was withdrawn from the furnace and allowed to cool. The black product was subjected to X-ray analysis and identified as $Bi_2Ru_2O_7$.

A number of $Bi_2Ru_2O_7$/glass resistor compositions were made and tested, each containing different proportions of conductor and glass components. The resistor compositions were prepared by mixing in the proportions to be tested finely divided $Bi_2Ru_2O_7$ and glass frit. The glass, a low melting variety, was composed of 10% $B_2O_3$, 25% $SiO_2$ and 65% PbO by weight. The mixture of oxide and powdered glass frit was mixed with a vehicle consisting of 8% ethylcellulose and 92% $\beta$-terpineol to provide a suitable consistency. The mixture was then screen-printed through a 165-mesh screen onto an alumina (96% dense $Al_2O_3$) substrate. It should be noted that the dielectric substrate can be composed of many materials that will withstand the firing temperatures necessary to bind the resistor to the substrate.

After the $Bi_2Ru_2O_7$/glass compositions had been applied to the dielectric substrate in uniform thickness, the compositions were dried to remove solvent. The assemblages were then fired in a conventional furnace at 750° C./10 minute peak cycle over a 45-minute period. At the temperature of 750° C. the glass frit was molten, thereby bonding the conductive material to the ceramic dielectric substrate.

The resulting fired resistors were about 0.001 inch thick. X-ray diffractometer data taken on a finished resistor showed that the $Bi_2Ru_2O_7$ was essentially unaffected by heating with the glass binder, since its X-ray pattern was unchanged. Results of resistivity measurements made on the various resistors fabricated by this method are set forth in Table I. The data in the table show, inter alia, the considerable latitude over which resistivity may be varied with retention of a low temperature coefficient of resistivity.

TABLE I

| Weight proportion of $Bi_2Ru_2O_7$ to low melting glass | Resistivity in ohms/square for a 0.001" layer | Temperature coefficient of resistivity over the range 25° C. to 125° C. in p.p.m./° C.[1] |
|---|---|---|
| 1.00:0.25 | 34.0 | −65 |
| 1.00:0.50 | 62.1 | −5 |
| 1.00:0.75 | 210 | +40 |
| 1.00:1.00 | 1205 | +55 |
| 1.00:1.50 | 13,560 | +137 |

[1] As employed here and subsequently, temperature coefficient of resistivity (TCR) is the difference in resistivity between temperatures $T_1$ and $T_2$ divided by the product of resistivity at $T_1$ and the temperature difference in degrees, said quotient being multiplied by $10^6$.

EXAMPLE 2

Substitution of other elements for Bi, Ru or Ir in $Bi_2(Ru,Ir)_2O_7$ in accordance with the general formula $(M_xBi_{2-x})\ (M'_yM''_{2-y})O_{7-z}$, wherein M, M', M'', $x$, $y$ and $z$ are as defined previously, enables controlled change in resistivity and temperature coefficient of resistivity and temperature coefficient of resistivity (TCR) from that typical of unsubstituted $Bi_2Ru_2O_7$, and $Bi_2Ir_2O_7$. Table II illustrates such changes. The resistor compositions were prepared as described in Example 1 with, however, an oxide: glass ratio of 42:58 parts by weight. The results clearly show that substitution alters resistivity and TCR.

TABLE II

| Compound | Resistivity (ohms/square) | TCR[1] Hot | TCR[1] Cold |
|---|---|---|---|
| $Bi_2Ru_2O_7$ | 1,600 | +163 | +157 |
| $Bi_2Ir_2O_7$ | 130,000 | −216 | −551 |
| $Cd_{0.1}Bi_{1.9}Ru_2O_{6.95}$[2] | 1,100 | +300 | +300 |
| $Bi_2IrRuO_7$ | 13,500 | +60 | −40 |

[1] Temperature coefficient of resistivity in parts per million/° C. over the following temperature ranges: Hot, +25 to +125° C.; Cold, −75 to +25° C.

[2] Prepared by grinding a mixture of 0.8920 g. of CdO, 20.2394 g. of $Bi_2O_3$, and 11.9763 g. $RuO_2$ and firing it in a platiumn crucible in air for about 72 hours. The product gave an X-ray diffraction pattern typical of a well-crystallized pyrochlore-type composition.

EXAMPLE 3

Various pyrochlore-related oxides and resistor compositions therefrom were prepared as in Example 1, except that (1) the glass grit consisted of 62% PbO, 29% $SiO_2$, 6% $Al_2O_3$ and 3% CdO, (2) the resistor compositions had an oxide:glass ratio of 64:36, and (3) the resistor compositions were fired at 900° C. peak temperature. The specific pyrochlore-related oxides utilized and the properties of the fired resistors are set forth in Table III.

TABLE III

| Compound | Resistivity (ohms/square) | TCR | |
|---|---|---|---|
| | | Hot | Cold |
| $Pb_{1.5}Cd_{0.5}Ru_{1.5}Ir_{0.5}O_{6.0}$ | 13,500 | +87 | +107 |
| $Pb_{1.5}Bi_{0.5}Ru_2O_{6.25}$ | 3,800 | +71 | +75 |
| $Pb_{1.5}Eu_{0.5}Ru_2O_{6.25}$ | 12,500 | +8 | −26 |
| $Pb_{1.5}Cd_{0.5}Ru_2O_{6.0}$ | 33,900 | −4 | −19 |
| $Pb_2Ru_2O_{6.0}$ | 143,600 | −46 | −129 |

I claim:

1. A composition for making electrical elements consisting essentially of a powdered mixture of (1) an oxide of the formula $$(M_xBi_{2-x})(M'_yM''_{2-y})O_{7-z}$$

wherein

- M is at least one metal selected from the group consisting of yttrium, thallium, indium, cadmium, lead and the rare earth metals of atomic number 57–71, inclusive,
- M' is at least one metal selected from the group consisting of platinum, titanium, tin, chromium, rhodium, rhenium, zirconium, antimony and germanium;
- M'' is at least one of ruthenium and iridium;
- $x$ is a number in the range 0–2;
- $y$ is a number in the range 0–2; and
- $z$ is a number in the range 0–1, being at least equal to about $x/2$ when M is a divalent metal, and (2) dielectric material.

2. A composition for making electrical elements consisting essentially of a powdered mixture of (1) 5–90% by weight of an oxide of the formula $$(M_xBi_{2-x})(M'_yM''_{2-y})O_{7-z}$$

wherein

- M is at least one metal selected from the group consisting of yttrium, thallium, indium, cadmium, lead and the rare earth metals of atomic number 57–71, inclusive,
- M' is at least one metal selected from the group consisting of platinum, titanium, tin, chromium, rhodium, rhenium, zirconium, antimony and germanium;
- M'' is at least one of ruthenium and iridium;
- $x$ is a number in the range 0–2;
- $y$ is a number in the range 0–2; and
- $z$ is a number in the range 0–1, being at least equal to to about $x/2$ when M is a divalent metal, and (2) 95–10% by weight of dielectric material.

3. A composition in accordance with claim 2 which is dispersed in an inert liquid vehicle.

4. A composition in accordance with claim 2 wherein M' is at least one of platinum, titanium, rhodium and rhenium.

5. A composition in accordance with claim 2 wherein said ternary oxide is $Bi_2Ru_2O_7$.

6. A composition in accordance with claim 2 wherein said ternary oxide is $Bi_2Ir_2O_7$.

7. A composition in accordance with claim 2 wherein said ternary oxide is from the group consisting of $Pb_{1.5}Bi_{0.5}Ru_2O_{6.25}$, $Pb_{1.5}Cd_{0.5}Ru_2O_6$, and $$Pb_{1.5}Cd_{0.5}Ru_{1.5}Ir_{0.5}O_6$$

8. A composition for making electrical elements consisting essentially of a powdered mixture of (1) an oxide of pyrochlore-related crystal structure of the formula $$(M_xBi_{2-x})(M'_yM''_{2-y})O_{7-z}$$

wherein

- M is at least one of yttrium, thallium, indium, cadimum, lead and rare earth metals of atomic number 57–71, inclusive;
- M' is at least one of platinum, titanium, chromium, rhodium and antimony;
- M'' is at least one of ruthenium and iridium;
- $x$ is a number in the range 0 to 1;
- $y$ is a number in the range 0 to about 0.5, or a number in the range 0 to 1 when M' is rhodium or more than one of platinum, titanium, chromium, rhodium and antimony; and
- $z$ is a number in the range 0 to 1, being at least equal to about $x/2$ when M is divalent lead or cadmium, and (2) solid dielectric material.

9. A composition in accordance with claim 8 which is dispersed in an inert liquid vehicle.

10. An electrical element comprising an electrically nonconductive substrate having fired thereon the resistor composition of claim 1.

11. An electrical element comprising an electrically nonconductive substrate having fired thereon the resistor composition of claim 2.

12. An electrical element comprising an electrically nonconductive substrate having fired thereon the resistor composition of claim 4.

13. An electrical element comprising an electrically nonconductive substrate having fired thereon the resistor composition of claim 5.

14. An electrical element comprising an electrically nonconductive substrate having fired thereon the resistor composition of claim 6.

15. An electrical element comprising an electrically nonconductive substrate having fired thereon the resistor composition of claim 7.

16. An electrical element comprising an electrically nonconductive substrate having fired thereon the resistor composition of claim 8.

References Cited

UNITED STATES PATENTS 3,553,109 1/1971 Hoffman ---------- 252—521

DOUGLAS J. DRUMMOND, Primary Examiner

U.S. Cl. X.R.

252—521

Disclaimer 3,681,262.—*Robert J. Bouchard*, Wilmington, Del. COMPOSITIONS FOR MAKING ELECTRICAL ELEMENTS CONTAINING PYROCHLORE-RELATED OXIDES. Patent dated Aug. 1, 1972. Disclaimer filed Sept. 13, 1972, by the assignee, *E. I. du Pont de Nemours and Company.*

Hereby disclaims the portion of the term of the patent subsequent to June 8, 1988.

[*Official Gazette January 16, 1973.*]